United States Patent [19]

Stockton

[11] 4,454,786
[45] Jun. 19, 1984

[54] FOUR SPEED TORQUE CONVERTER TRANSAXLE AND ACCESSORY DRIVE SYSTEM

[75] Inventor: Thomas R. Stockton, Ann Arbor, Mich.

[73] Assignee: Ford Motor Company, Dearborn, Mich.

[21] Appl. No.: 301,795

[22] Filed: Sep. 14, 1981

[51] Int. Cl.³ .................. F16H 47/08; F16H 37/06; F16H 37/08; F16D 19/00
[52] U.S. Cl. .................. 74/688; 74/665 A; 74/695; 74/759; 192/87.15
[58] Field of Search ............ 74/688, 762, 763, 665 A, 74/665 B, 677, 695, 730, 758, 759; 192/87.1, 87.11, 87.12, 87.13, 87.14, 87.15, 87.16, 87.17, 87.18, 85 AA

[56] References Cited

U.S. PATENT DOCUMENTS

| Re. 27,937 | 3/1974 | Hensel | 192/87.11 |
|---|---|---|---|
| 2,919,608 | 1/1960 | Hause | 74/677 |
| 3,103,832 | 9/1963 | Foerster | 74/759 |
| 3,279,573 | 10/1966 | Hensel | 192/87.11 |
| 3,355,967 | 12/1967 | Moan | 74/688 |
| 3,386,314 | 6/1968 | Stockton | 74/759 |
| 3,466,947 | 9/1969 | Smith | 74/759 |
| 3,507,168 | 4/1970 | Carp | 74/688 |
| 3,611,835 | 10/1971 | Borman | 74/688 |
| 3,620,100 | 11/1971 | Chana | 74/688 |
| 3,772,940 | 11/1973 | Ohtsuka et al. | 192/87.13 X |
| 3,986,413 | 10/1976 | Stockton | 74/688 |
| 4,226,123 | 10/1980 | Croswhite | 74/688 |
| 4,287,781 | 9/1981 | Zenker | 192/87.1 X |

Primary Examiner—Leslie Braun
Assistant Examiner—Stephen B. Andrews
Attorney, Agent, or Firm—Donald J. Harrington; Keith L. Zerschling

[57] ABSTRACT

A four speed ratio transaxle for an automotive vehicle driveline comprising two simple planetary gear units arranged with fluid pressure operated clutches and brakes to provide four forward driving ratios, the top speed ratio being a direct drive, two of the ratio controlling clutches having a common fluid pressure cylinder and a pair of nested clutch actuating pistons to provide maximum space economy, one of the ratio changing clutches being arranged in radial disposition with respect to a reverse brake band, and a two speed accessory drive connected to torque delivery elements of the transaxle including an integrated transmission pump for supplying clutch-and-brake actuating pressure.

6 Claims, 8 Drawing Figures

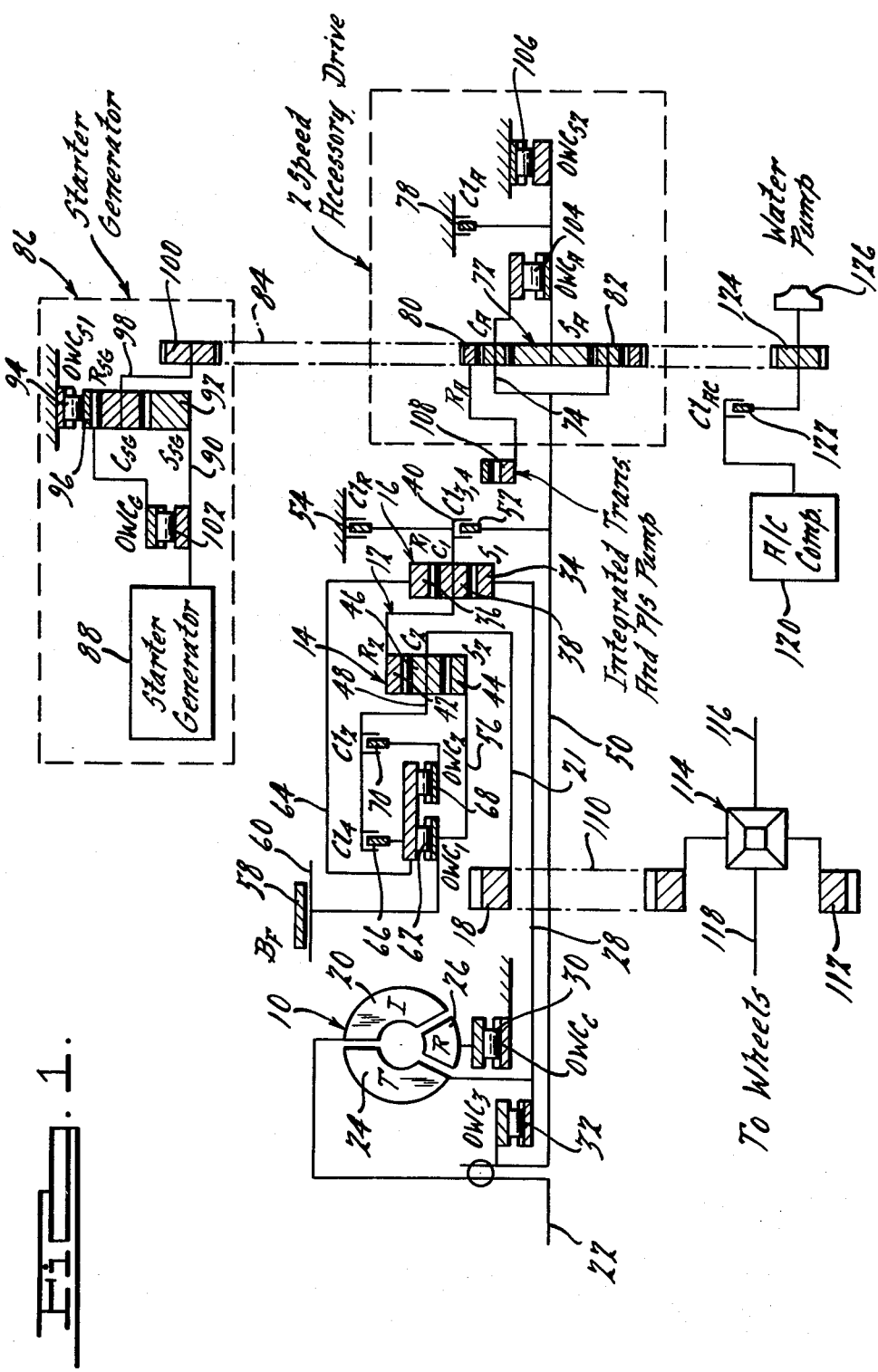

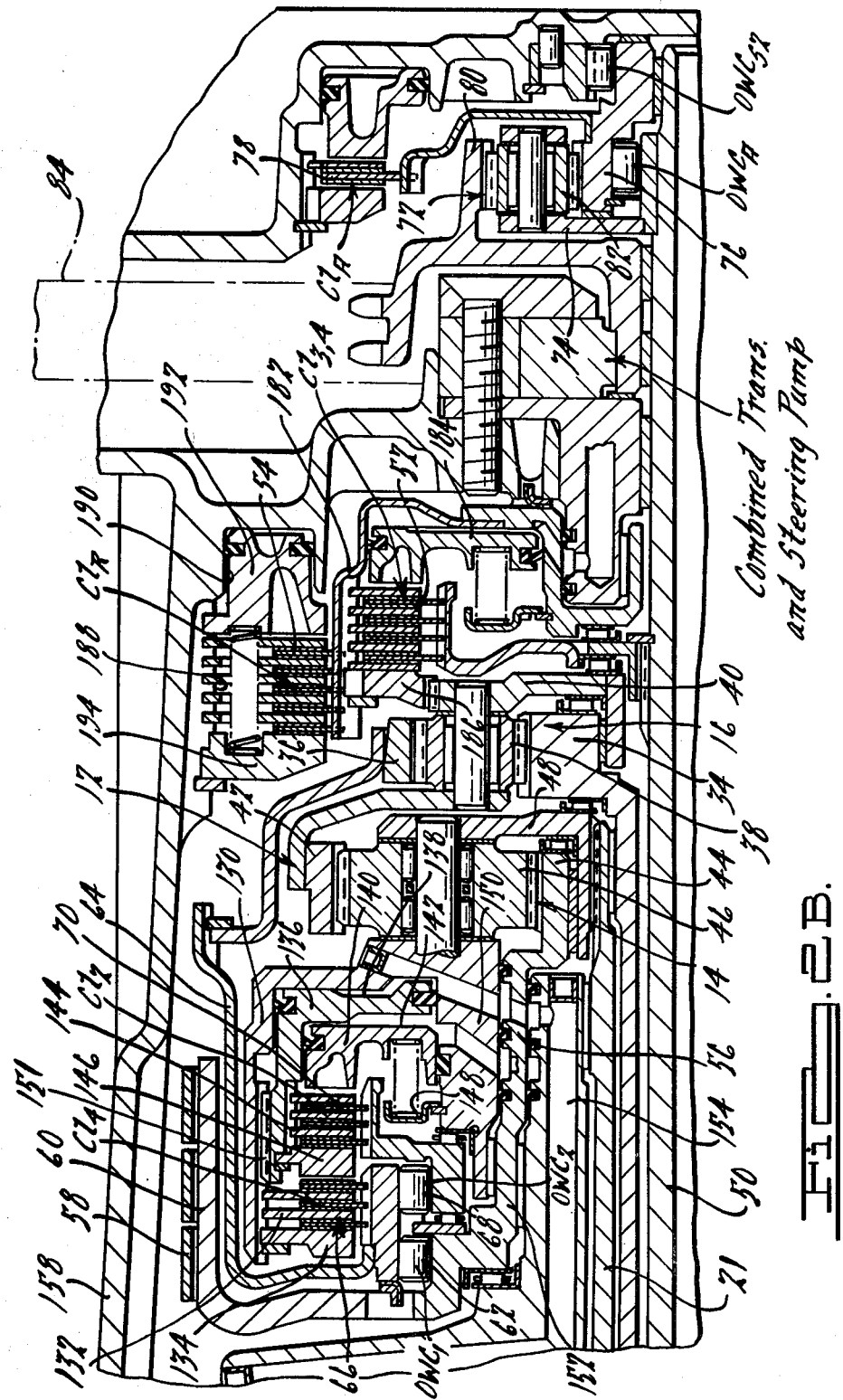

| Ratio | $Cl_R$ | $Cl_2$ | $Cl_4$ | $Cl_{3,4}$ | $B_F$ | $OWC_1$ | $OWC_2$ | $OWC_3$ |
|---|---|---|---|---|---|---|---|---|
| 1 |  |  |  |  | ⊗ | ⊗ |  |  |
| 2 |  | ⊗ |  |  | ⊗ |  | ⊗ |  |
| 3 |  | × |  | ⊗ | ⊗ |  |  |  |
| 4 |  | × | ⊗ | ⊗ | × |  |  | ⊗ |
| R | ⊗ |  |  |  |  | ⊗ |  |  |

$$\text{Converter (1)} \quad \left(1+\frac{R_1}{S_1}\right)\left(1+\frac{R_2}{S_2}\right) = 3.770$$

$$\text{Converter (2)} \quad \left(1+\frac{R_1}{S_1}\right)\left(1+\frac{S_2}{R_2}\right) - \frac{R_1}{S_1} = 2.170$$

$$\text{TE/FWD Solid (3)} \quad 1+\frac{S_2}{R_2} = 1.450$$

$$\text{Solid (4) Direct} = 1.000$$

$$\text{Converter (Rev)} \quad -\frac{R_1}{S_1}\left(1+\frac{R_2}{S_2}\right) = -5.155$$

$$\left.\begin{array}{l}1.737 \quad \text{1-2 Step} \\ 1.497 \quad \text{2-3 Step} \\ 1.450 \quad \text{3-4 Step}\end{array}\right.$$

FIG. 7.

| | Torque | | | | | | | | | | | | | | |
|---|---|---|---|---|---|---|---|---|---|---|---|---|---|---|---|
| | $R_1$ | $C_1$ | $S_1$ | $R_2$ | $C_2$ | $S_2$ | $S_r$ | $Cl_R$ | $Cl_3$ | $Cl_4$ | $Cl_{3,4}$ | $OWC_1$ | $OWC_2$ | $OWC_3$ | $OWC_c$ |
| 1st Stall | 3.200 | 5.200 | 2.000 | 5.700 | 7.540 | 2.340 | 6.290 | 0 | 0 | 0 | 0 | 3.200 | 0 | 0 | 1.000 |
| 1st | 1.600 | 2.600 | 1.000 | 2.600 | 3.770 | 1.170 | 2.770 | 0 | 0 | 0 | 0 | 1.600 | 0 | 0 | 0 |
| 2nd | 1.600 | 2.600 | 1.000 | 2.600 | 3.770 | 1.170 | 1.170 | 0 | 1.600 | 0 | 0 | 0 | 1.600 | 0 | 0 |
| 3rd | 0 | 0 | 0 | 1.000 | 1.450 | .450 | .450 | 0 | 0 | 0 | 1.000 | 0 | 0 | 0 | 0 |
| 4th | 1.000 | 1.675 | .675 | 0 | 0 | 0 | 0 | 0 | 0 | 1.000 | 1.675 | 0 | 0 | .675 | 0 |
| Rev.Stall | 3.200 | 5.200 | 2.000 | 7.110 | 10.310 | 3.200 | 0 | 11.560 | 0 | 0 | 0 | 3.200 | 0 | 0 | 1.000 |
| Rev. | 1.600 | 2.600 | 1.000 | 3.555 | 5.155 | 1.600 | 0 | 6.155 | 0 | 0 | 0 | 1.600 | 0 | 0 | 0 |

FIG. 6.

FOUR SPEED TORQUE CONVERTER TRANSAXLE AND ACCESSORY DRIVE SYSTEM

GENERAL DESCRIPTION OF THE INVENTION

My invention comprises improvements in the gear system shown in my U.S. Pat. No. 3,986,413. That gear system comprises a pair of simple planetary gear units wherein provision is made for effecting four forward driving ratios and a single reverse ratio, the fourth speed ratio being a regenerative drive that includes a hydrokinetic coupling. The gear units are a part of a transaxle transmission having an output element for the gearing located between the coupling and the planetary gear units. The output element is connected by means of a chain transfer drive to a differential-and-axle assembly, the axis of the axle shafts for the differential-and-axle assembly being generally parallel to the axis of the gearing.

The transaxle of my present invention is similar to the transaxle geometry described in my patent with respect to the relative disposition of the output element, the gearing and the hydrokinetic unit. My present invention is distinguishable from the transaxle of my patent, however, by the inclusion of a compact pair of friction clutches for controlling the relative speeds of the gear elements to effect ratio changes between the second, third and fourth speed ratios. In addition I have included in my present invention an overrunning coupling arrangement located radially inwardly with respect to the friction elements of the compact clutches to provide nonsynchronized upshifts from the second to the third ratio. A one way coupling is situated between the turbine and the impeller of the hydrokinetic unit to prevent relative motion of the turbine with respect to the impeller during operation in the fourth ratio, which is a regenerative drive mode. This, in effect, eliminates the torque converter from the torque delivery path during fourth ratio operation; and it also prevents slip during operation in the second ratio hill braking drive mode.

My present invention includes a hydrokinetic torque converter, unlike the mechanism described in my patent which uses a hydrokinetic coupling. A hydrokinetic torque converter is inefficient for regenerative torque delivery because of the geometry of the torque converter impeller and turbine blades. Unlike the coupling of the arrangement shown in my patent where the geometry of the blades can be chosen so that the turbine is capable of functioning as a impeller during fourth ratio operation thus establishing a regenerative drive, the torque converter impeller and turbine of my present invention have blading that would render regenerative torque delivery rather inefficient. Excessive converter slip during fourth ratio operation is avoided by using a converter rather than a coupling.

The improved structure of my present invention includes also for a two speed accessory drive that is driven directly by a drive shaft connected to the engine crankshaft through a damper. At high engine speeds a speed reduction occurs in the accessory driveline. An integrated transmission pump, which also may serve as a power steering oil pump for vehicle installations that require a power steering pump, forms a part of the accessory drive mechanism and benefits by the reduced ratio of the accessory drive during high speed operation. Other accessories, such as the air conditioning compressor and the engine water pump, are driven by a separate chain and sprocket in a torque flow path that differs from the torque flow path for the integrated transmission and power steering pump.

Provision is made for establishing a relatively high torque ratio in the accessory drive during engine cranking in the engine starting mode. A starter-generator is used to provide cranking torque. When the starter-generator is operating in the generator mode, the starter-generator gear set drives directly through a one way clutch located in the starter-generator gear set.

I am aware of prior art disclosures that employ nested, compact clutch assemblies that have some similarity to the clutch assemblies used in my present invention for controlling ratio changes between the second, third and fourth ratios. Examples of these prior art disclosures are U.S. Pat. No. Re. 27,937 and U.S. Pat. No. 3,279,573, the former being a reissue of the latter. The clutch mechanism shown in those reference patents, however, is incapable of effecting simultaneous engagement of both clutch portions since one clutch portion of necessity would become released upon application of the other, and vice versa. The clutches of my present invention are capable of establishing selective clutch engagement and release as well as simultaneous clutch engagement and release. This operating pattern is essential for the gear system of my invention as the four forward driving ratios and the single reverse ratio are established and disestablished.

BRIEF DESCRIPTION OF THE FIGURES OF THE DRAWINGS

FIG. 1 is a schematic representation of the four speed planetary transmission and assembly drive of my invention.

FIG. 6 is a chart that shows the ratios for the transmission of FIG. 2 together with the ratio steps.

FIG. 7 is a chart that shows the torque applied to the gear elements and the clutches for the transmission of FIG. 2 in each of the forward driving ratios and the reverse ratio.

PARTICULAR DESCRIPTION OF THE INVENTION

Figure 2A:
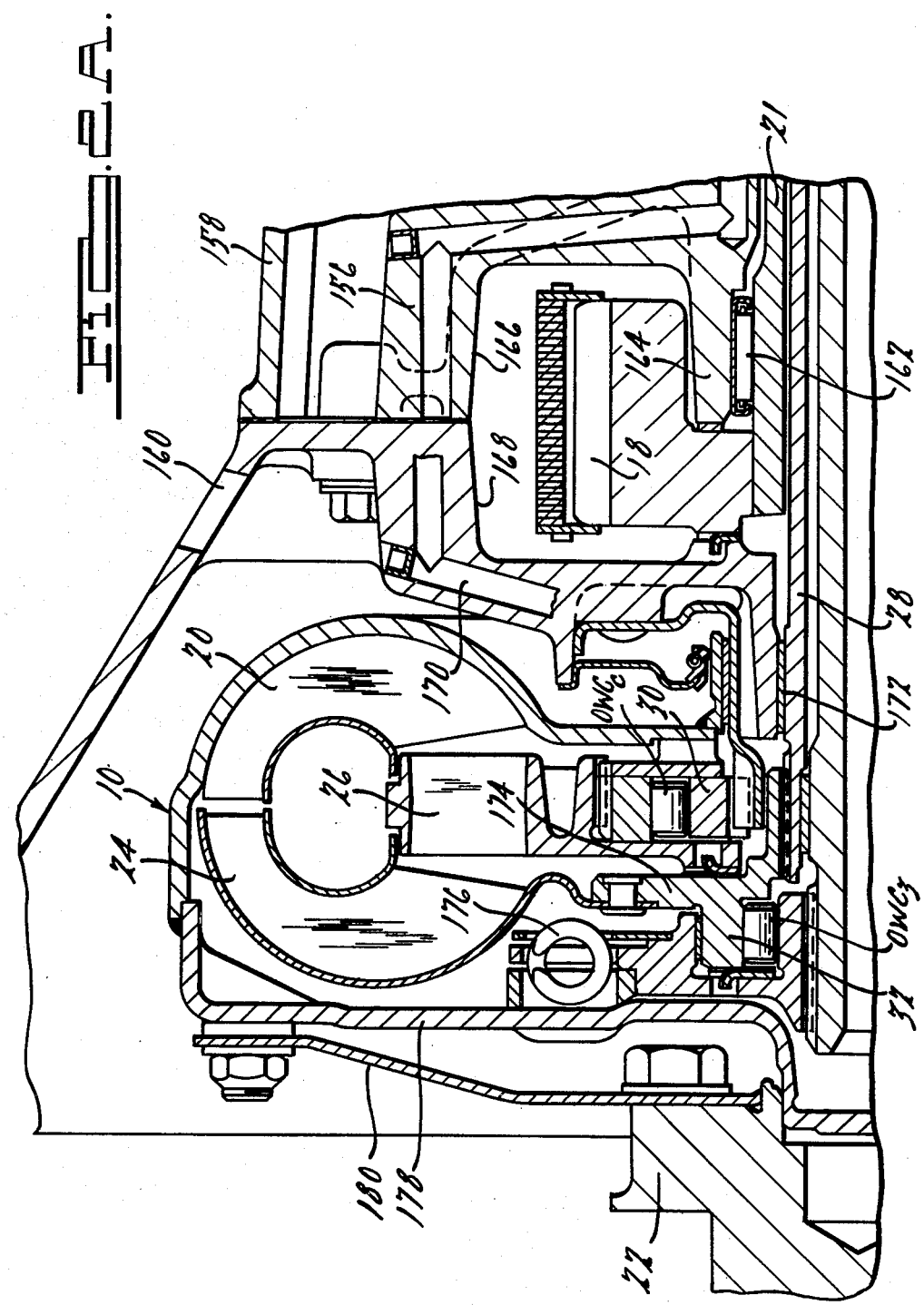
FIG. 2 is a cross-sectional view of a preferred embodiment of the four speed transmission illustrated schematically in FIG. 1.

In FIG. 1 reference numeral 10 designates generally a hydrokinetic torque converter. A planetary gear system 12 includes a pair of simple planetary gear units 14 and 16. A torque output chain drive sprocket 18 is located between the converter 10 and the gearing 12 and is connected drivably to power output sleeve shaft 21.

Torque converter 10 includes an impeller 20 connected drivably to crankshaft 2 of an internal combustion engine. It includes also a bladed turbine 24 and a bladed stator 26, the impeller, the turbine and the stator being arranged in the usual fashion in a torus circuit.

Turbine 24 is connected to turbine sleeve shaft 28. Overrunning coupling 30 forms a part of the stator assembly and accommodates distribution of stator torque to the transmission housing during operation of the converter in the torque conversion mode. It accommodates freewheeling motion of the stator during operation of the converter in the coupling mode.

An overrunning coupling 32 disposed between the impeller 20 and the turbine sleeve shaft 28 is adapted to accommodate the transfer of regenerative torque of the gearing from the shaft 28 to the impeller although it permits slip to occur in the converter during normal converter operation in the other forward driving ratios. The turbine is driven at a slightly lower speed than the impeller during normal coupling operation of the converter so that the overrunning coupling 32 freewheels.

Gear unit 16 comprises a sun gear 34, ring gear 36 and planet pinions 38, the latter being journalled on carrier 40. Ring gear 42 of the gear unit 14 is connected directly to the carrier 40. Gear unit 14 includes also sun gear 44 and planet pinions 46, the latter being journalled on carrier 48. Pinions 46 and pinions 38 drivably engage their respective ring and sun gears. Carrier 48 is connected drivably to torque output sleeve shaft 21.

A central shaft 50 is connected directly through a damper with crankshaft 2. It is connected also through a selectively engageable friction clutch 52 with the carrier 40 during operation in the third and fourth forward driving ratios. Carrier 40 is adapted to be selectively braked by friction brake 54 to the transmission housing during operation in the reverse ratio.

Sun gear 44 is connected through sleeve shaft 56 with a selectively engageable forward drive friction brake band 58 which surrounds brake drum 60. Brake band 58 can be applied and released by a fluid pressure operated servo in the usual fashion.

Sun gear sleeve shaft 56 is connected to the inner race of an overrunning coupling 62, the outer race being connected to torque transfer member 64, which is connected directly to the ring gear 36 of the gear unit 16. The outer race of the overrunning coupling 62 is adapted to be connected to the carrier 48 of the gear unit 14 through a selectively engageable friction clutch 66. Similarly, the inner race of another overrunning coupling 68 is adapted to be connected to the carrier 48 through a selectively engageable friction clutch 70. The outer race for the overrunning coupling 68 is common to the outer race for the overrunning coupling 62.

A two speed accessory drive is schematically illustrated in FIG. 1. It includes a simple planetary gear unit 72 having a carrier 74 that is connected drivably to the central shaft 50. Gear unit 72 includes also a sun gear 76 which is adapted to be braked to the transmission housing through selectively engageable friction clutch 78 which meshes with planet pinions 82 journalled on the carrier 74. The ring gear carries sprocket teeth that engage drivably transfer chain 84.

A starter-generator assembly 86 includes a starter-generator unit 88. The armature of the starter-generator unit 88 is connected through shaft 90 with starter sun gear 92. An overrunning brake 94 anchors ring gear 96 of the starter-generator gear unit. Carrier 98 of the starter-generator gear unit is connected to starter pinion 100. When the unit 88 is acting as a starter motor, overrunning coupling 94 delivers reaction torque from the ring gear to the transmission housing. When the unit 88 acts as a generator, pinion 100 drives the gear unit in a 1:1 ratio as torque is delivered through the overrunning clutch 102 to the generator rotor. Overrunning clutch 102 freewheels, of course, when the unit 88 acts as a starter motor.

Clutch 78 is engaged to provide a torque reaction point to effect a speed up or overdrive of the gear unit 72 in the two speed accessory drive. When the clutch 78 is released, overrunning coupling 104 connects drivably sun gear 76 with the carrier 74 thereby achieving a 1:1 driving ratio in the gear unit 72.

Overrunning brake 106 provides a reaction point for the sun gear of the gear united 76 when the unit 88 acts as a starter motor. This provides a torque multiplication in the gear unit 72 as the starter motor cranks the engine crankshaft 22.

An integrated transmission and power steering pump is schematically shown at 108. It is connected drivably to the ring gear 80. Thus the pump is capable of being driven as part of the accessory drive system with either of two speed ratios to reduce horsepower loss during operation of the vehicle at high speeds although the pump capacity at low vehicle speeds can be maintained as the speed ratio of the accessory drive ratio permits overspeeding of the pump relative to the crankshaft speed.

Output sprocket 18 is connected drivably through a chain 110 with the ring gear 112 of a differential-and-axle assembly indicated generally by reference character 114. Axle shafts 116 and 118 extend to the vehicle traction wheels, and their axes are generally in alignment with the axes of the gear unit and converter.

The schematic drawing of FIG. 1 shows an air conditioning compressor at 120 which may be clutched by an air conditioner clutch 122 to sprocket 124, which is driven by chain 84. Sprocket 124 also drives the engine water pump 126.

FIG. 2 shows a working embodiment of the transmission illustrated schematically in FIG. 1. As seen in FIG. 2 the overrunning couplings 62 and 68 are located radially inwardly of and are nested within friction clutches 66 and 70. The brake drum 60 encircles the clutches 66 and 70 as well as the torque transfer member 64. Clutch 66 includes an annular clutch cylinder 130 which is internally splined to externally splined clutch discs 132 and to clutch disc backup ring 134. Received within clutch cylinder 130 is secondary clutch cylinder 136, which acts as a piston for clutch 70. Cylinder 130 and secondary cylinder 136 cooperate to define a pressure cavity 138. Located within cylinder 136 is a fluid pressure operated piston 140 which cooperates with the cylinder 136 to define a pressure cavity 142.

Cylinder 136 is internally splined to externally splined discs 144 of the clutch 70. Clutch plate backup ring 146 is externally splined to the cylinder 136 and is held axially fast by a snap ring as indicated.

The radially outward margin of the cylinder 136 is keyed at 151 to the interior of the cylinder 130 and is adapted to slide within the cylinder 130 in an axial direction although relative rotation of the cylinder 136 with respect to the cylinder 130 is prevented by the key connection.

When fluid pressure is admitted to the cavity 138, the pressure force produced on the cylinder 136 is transmitted to the plate 146 and hence to the clutch plates 132 thus engaging the clutch 66. At that time clutch 70 is released. If, however, pressure is admitted to the cavity 142, cylinder 140 applies an engaging force to the clutch discs 144 and the ring 146 acts as a reaction point. The pressure in chamber 142 also tends to shift the plate 146 away from the disc 132 for the clutch 66 thus assuring, that the clutch 66 may be disengaged when it is desired to engage clutch 70 individually.

Return springs 148 are anchored on a spring seat that is held axially fast on the hub 150 of the annular cylinder 130.

Sun gear 44 of gear unit 14 is connected to or is formed integrally with sleeve shaft 152, which in turn is journalled on and supported by stationary sleeve 154, which forms a part of support wall 156 of the transmission housing 158. Housing 158 is bolted or is otherwise secured to an impeller housing 160, the left hand margin of which is adapted to be connected to the engine block of the internal combustion engine.

The output sleeve shaft 21 is journalled by bearing 162 on bearing support 164 which forms a part of the forward wall 156 of the transmission housing 158. Sprocket 18 is located within recesses 166 and 168 formed, respectively, in housing wall 156 and in support wall 170 of the housing 160. Wall 170 forms a bearing support at 172 for the sleeve shaft 28 and for the turbine hub 174 which also forms the outer race for the overrunning coupling 32. The inner race for the coupling 32 is splined to shaft 50 and is connected through damper assembly 176 to the impeller housing 178, which in turn is connected to the crankshaft 22 through a drive plate 180.

As seen in FIG. 2, clutches 52 and 54 are arranged in radial disposition to provide a minimum axial dimension. Clutch 52 is provided with a cylinder stamping 182 which receives an annular piston 184. Piston 184 is adapted to apply a clutch engaging force to clutch discs of the clutch 52, alternate ones of which are externally splined to the inner periphery of the cylinder 182. Clutch backup plate 186 is keyed or splined to the outer margin of carrier 40 for the gear unit 16. Alternate discs of the friction brake 54 are splined to the outer periphery of the cylinder 182, and the registering discs of the brake 54 are externally splined to the housing 158 as shown at 188. Housing 158 is formed with an annular cylinder 190. It contains an annular piston 192 which is adapted to apply an engaging force to the discs of the brake 54. The reaction for the engaging force is taken on annular backup ring 194 which is secured to the housing 158.

Figures 4, 5:
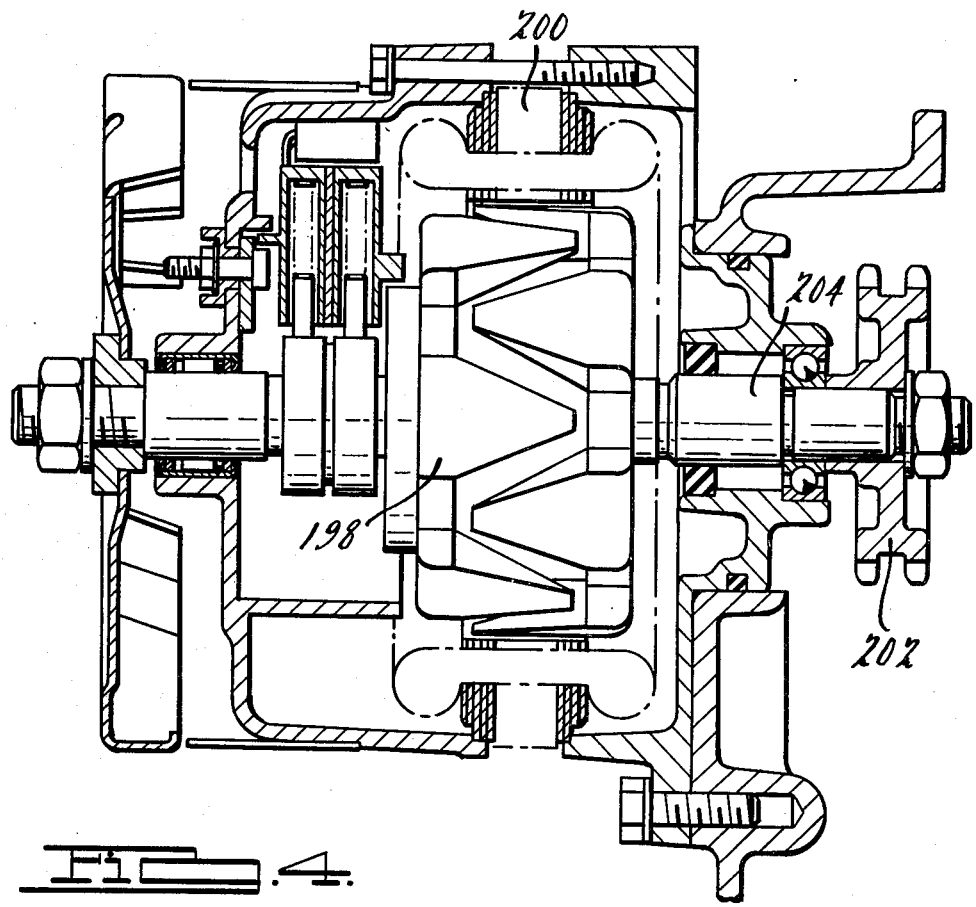
FIG. 4 shows a typical engine alternator assembly that may be drivably coupled to the transmission of FIG. 2.
FIG. 5 is a chart that shows the clutch and brake engagement and release pattern for establishing the various ratios in the transmission of FIG. 1.

In FIG. 5 I have shown the engagement and release pattern for the clutches and brakes to establish the various driving ratios in the transmission. The clutch and brake members that are applied for the various ratios are designated in FIG. 5 by the symbol "x", but the engaged members that deliver torque for the various ratios are designated also by a circle around the "x" symbol. In order to correlate the FIGS. 1, 2 and 5, the reverse brake 54 is referred to in the Figures as brake $C_{LR}$; clutch 70 is identified as clutch $C_{L2}$, clutch 66 is identified as clutch $C_{L4}$, and clutch 52 is identified as clutch $C_{L3,4}$. The forward brake 58 is identified as brake $B_F$ and the overrunning couplings 62, 68 and 32 are identified, respectively, by the symbols $OWC_1$, $OWC_2$ and $OWC_3$.

To establish first speed ratio operation it merely is necessary to engage the forward brake $B_F$(58). Sun gear 44 thus acts as a reaction point as turbine torque is distributed to the sun gear 34. The reaction torque on the ring gear 36 is distributed through the overrunning coupling $OWC_1$ to the engaged forward brake $B_F$. Torque on the carrier 40 is distributed to the ring gear 42 and the driven carrier 48 then drives the sprocket 18.

To establish a ratio change to the second speed ratio, it merely is necessary to engage clutch $C_{L2}$ (70). Reaction torque on the ring gear 36 now is distributed through the overrunning coupling $OWC_2$ and through the engaged clutch 70 to the carrier 48. There thus is a split torque delivery path through the planetary gearing.

A ratio change to the third speed ratio is achieved by engaging simultaneously clutches $C_{L2}$ and $C_{L3,4}$. The forward brake $B_F$ remains applied and turbine torque then is distributed through the engaged clutch $C_{L3,4}$ to the ring gear 42 with the sun gear 44 acting as a reaction point. Carrier torque from carrier 48 is distributed to the output sprocket 18. To achieve a ratio change to the forward, direct-drive ratio, all three clutches $C_{L2}$, $C_{L4}$ and $C_{L3,4}$ are applied. The overrunning coupling $OWC_3$ prevents overrunning of the sun gear 34 with respect to the impeller and converter slip is prevented as a regenerative torque is distributed from sun gear 34 to the impeller.

Reverse drive is achieved by engaging clutch $C_{LR}$ and releasing forward brake $B_F$ and the three clutches. With the carrier 40 now acting as a reaction point, ring gear 36 is driven in a rearward direction and the rearward motion is transferred through the overrunning coupling $OWC_1$ to the sun gear 44. Since ring gear 42 is anchored by the brake $C_{LR}$, carrier 48 is driven in a rearward direction and it in turn drives the output sprocket 18.

Figure 3:
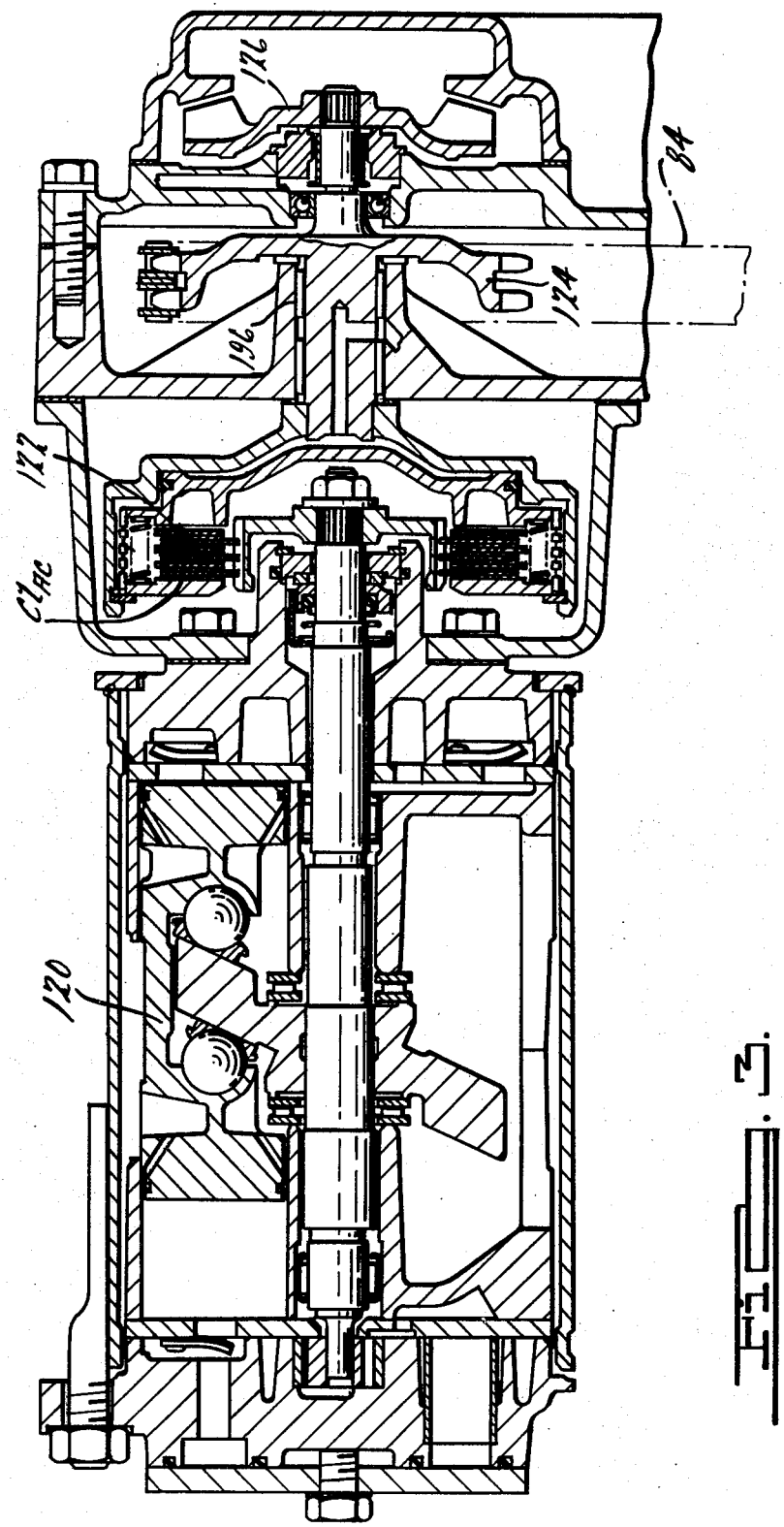
FIG. 3 is a cross-sectional view of a typical air conditioning compressor and air conditioning clutch that form a part of the accessory drive that is coupled to the transmission of FIG. 2.

FIG. 3 shows an air conditioning compressor and a drive clutch for the compressor. The torque input portion of the clutch 122 for the compressor 120 is driven by sprocket 124, the hub of which is journalled as shown at 196 in the transmission housing. The water pump rotor is connected also to the sprocket 124.

FIG. 1 shows in schematic form a starter-generator assembly 86 which is driven by the drive chain 84. In the alternative, an alternator assembly of the kind shown in FIG. 4 can be used if that is required by the particular engine with which the transmission is used. The alternator assembly includes a rotor 198, stator windings 200 and a drive sprocket 202 connected to the rotor shaft 204.

Having described a preferred embodiment of my invention, what I claim and desire to secure by U.S. Letters Patent is:

1. A multiple ratio power transmission mechanism for an engine driven vehicle comprising a hydrokinetic torque converter and a pair of simple planetary gear units;

said converter having an impeller connected to the engine of the vehicle and a turbine;

each planetary gear unit having a ring gear, a sun gear, a carrier and planet pinions on said carrier engaging said ring and sun gears;

said turbine being connected to the sun gear of a first of said gear units (16);

the carrier (40) of said first gear unit (16) being connected to the ring gear (42) of the second of said gear units (14);

forward drive brake means (58) for anchoring the sun gear (44) of said second gear unit (14) during operation in first, second and third forward driving ratios;

the carrier (48) of said second gear unit (14) being connected to a driven member (21) of said transmission;

first overrunning coupling means (62) for connecting the ring (36) of said first gear unit (16) with the sun gear (44) of said second gear unit (14);

first clutch means (66) for connecting the ring gear (36) of said first gear unit (16) to the carrier (48) of said second gear unit (14);

second clutch means (52) for connecting the impeller to the carrier (40) of the first gear unit (16) during operation in the third and fourth driving ratios;

brake means (54) for anchoring the carrier (40) of said first gear unit (16) during reverse drive operation;

second overrunning coupling means (32) between said impeller and said turbine for preventing the latter from overrunning the former during fourth speed ratio operation;

and third clutch means (70), 68) for connecting the ring gear (36) of said first gear unit (16) to the carrier (48) of said second gear unit (14), said third clutch means comprising a third overrunning coupling means (68) and a selectively engageable friction clutch (70) arranged in series relationship;

said friction clutch (70) being engaged during operation in second speed ratio operation wherein torque is distributed from said ring gear (36) of said first gear unit (16) and through said third overrunning coupling means (68) and said friction clutch (70).

2. The combination as set forth in claim 1 wherein said first clutch means (66) forms a torque delivery path between the ring gear of said first gear unit and the carrier of said second gear unit;

said first and second clutch means (66 and 52) being disposed in parallel relationship with respect to said second overrunning coupling means (32) whereby driving torque is distributed through said second overrunning coupling means (62) and said first and second clutch means (66 and 52) during fourth speed ratio operation.

3. The combination as set forth in claim 2 wherein said first clutch means and said friction clutch are arranged in adjacent side-by-side relationship;

said first clutch means comprising an annular cylinder (130);

said friction clutch (70) also comprising an annular cylinder (136) telescopically received in said first mentioned cylinder and acting therewith as a clutch piston;

said cylinders defining a first pressure chamber which when pressurized applies a clutch engaging force to said first clutch means;

said first clutch means (66) comprising first discs carried by said first mentioned cylinder and second discs registering therewith;

said first and third overrunning coupling means (62 and 68) having an outer race connected to said second discs;

said first and third overrunning coupling means having inner races;

the inner race for said first overrunning coupling means being connected to the sun gear of said second gear unit;

said friction clutch (70) having friction discs connected to the inner race of said third overrunning coupling means (68);

an annular piston (140) received in said second mentioned cylinder and cooperating therewith to define a second pressure chamber which when pressurized engages said friction clutch (70); and a pressure plate (146) carried by said second mentioned cylinder and adapted to act as a clutch pressure reaction point for said friction clutch (70) as said second chamnber is pressurized and as a pressure plate for said first clutch means as said first chamber is pressurized.

4. The combination as set forth in claim 2 including a forward drive brake comprising a brake drum surrounding said first and third clutch means and a brake band surrounding said brake drum and adapted to be applied and released during forward drive operation in said first, second and third ratios; and a torque transfer member connected to the outer race for said first and third overrunning coupling means and surrounding said first and third clutch means to form with said first overrunning coupling means a torque delivery path for the ring gear of said first gear unit.

5. A compound clutch assembly for a planetary gear assembly having relatively movable elements including;

a clutch cylinder 130 connected to one of said elements (48);

a pair of overrunning couplings (68 and 62) each having independent inner races and a common outer race;

first clutch discs carried by said common outer race;

second clutch discs registering with said first clutch discs carrier by said cylinder (130);

third clutch discs connected to the inner race of one of said overrunning couplings (68);

the inner race of the other overrunning coupling (62) being connected to another element (34) of said gear assembly;

a second annular cylinder (136) received within said first cylinder (130) and cooperating therewith to define a first pressure chamber;

an annular piston (140) in said second cylinder (136) and cooperating therewith to define second pressure chamber;

fourth clutch discs carried by said second cylinder registering with said third clutch discs;

a clutch backup ring (146) connected to said second cylinder and situated between said first and second discs on one side thereof and said third and fourth discs on the other side thereof;

said third and fourth discs being clutched together when pressure is admitted to said second pressure chamber whereby said third and fourth clutch discs are engaged frictionally as said pressure plate is held away from said first and second clutch discs;

said pressure plate frictionally engaging said first and second discs as pressure is admitted to said first pressure chamber and said pressure plate is held away from said third and fourth discs.

6. The combination as set forth in claim 5 wherein said gear assembly has three elements and said compound clutch assembly further includes a torque transfer member (64) connecting said common outer race with a third element (36) of said gear assembly; and brake means including a brake band surrounding said annular cylinders for anchoring said other element (34) of said gear assembly.

* * * * *